UNITED STATES PATENT OFFICE.

JOHN JOSEPH CHARLES SMITH, OF PASSAIC, N. J., ASSIGNOR TO THE NEW YORK INSULATED WIRE AND VULCANITE COMPANY, OF NEW YORK, N. Y.

MANUFACTURE OF RUBBER COMPOSITIONS.

SPECIFICATION forming part of Letters Patent No. 308,209, dated November 18, 1884.

Application filed April 7, 1884. (Specimens.)

*To all whom it may concern:*

Be it known that I, JOHN JOSEPH CHARLES SMITH, a citizen of the United States, residing at Passaic, in the county of Passaic and State of New Jersey, have invented certain new and useful Improvements in the Manufacture of Rubber Compositions, of which the following is a specification.

This invention consists in producing a vulcanizable composition of india-rubber or caoutchouc combined with ozocerite, mineral wax or paraffine, and sulphur. I have found that the mixture of mineral wax with caoutchouc and sulphur vulcanized produces remarkably good effects, whether manufactured in the form of soft elastic, semi-hard, or hard rubber.

The objects of this invention are to effect by the use of mineral wax or paraffine a great saving in caoutchouc, and at the same time to produce a vulcanized rubber which in all of its forms will possess and retain the softness, elasticity, and strength of pure rubber compound, and be in many respects superior thereto. Further, by this combination I can produce a semi-hard rubber which possesses qualities similar to those of fine pliable leather—that is to say, it may be bent, folded, crimped, and sewed like leather, and at the same time be absolutely water-proof. The soft elastic rubber made by this composition is also water-proof and retains an exceedingly soft and velvet-like appearance.

Most rubber-manufacturers use sundry prepared vulcanizable oils to mix with the rubber to produce cheaper compounds; but such oils can only be used in small quantities for fear of seriously affecting the quality of the rubber. In my improved composition, however, I can use from twenty-five to forty per cent. of earth-wax or ozocerite or paraffine with rubber, and still produce a compound having for many purposes all the good qualities of nearly pure rubber compounds, and being at the same time in many respects far superior thereto.

It has been proposed, in the manufacture of so-called "kerite," to use ozocerite, earth-wax, or paraffine with vegetable oils for the purpose of preventing too quick vulcanization of the compound; but I am not aware that earth-wax has been used, as proposed by me, with rubber to produce a composition superior to those before made.

In my experimenting I have found that paraffine, ozocerite, or mineral wax, when used to cheapen and improve rubber compounds, if it be mixed with caoutchouc and sulphur alone, will enter into a very imperfect combination with the rubber by vulcanization, so that the mineral wax will separate from the compound if the rubber be subjected, after vulcanization, to a moderate heat. Compounds thus formed are also lacking in strength and elasticity. To overcome this objectionable feature I went through a long series of experiments, and I found that a certain quantity of rosin or resinous substance mixed with ozocerite would effect a perfect union of the rubber and sulphur with the mineral wax, and thus produce a much stronger and more elastic composition.

The following is the preferred method of preparation of my improved rubber composition: I take one pound of ozocerite, otherwise called "mineral wax" or "earth-wax," paraffine, or cerosine, which is another name for a similar or analogous product, with which I melt from one-fourth to one-half pound of common rosin. This compound I then mix with four pounds of caoutchouc and one pound sulphur in a regular rubber-mill, and when well mixed it is ready for working into articles in the same manner as the other rubber compounds. The vulcanization of the articles is preferably effected by steam, so as at the same time to gain the advantage of the pressure of the steam. For soft or elastic rubber the time of vulcanization is two hours, starting at 235° Fahrenheit for one-half hour, and continuing at a heat of 245° Fahrenheit for the rest of the period. For semi-hard products the time for vulcanization is three hours at the same heat. For hard rubber or vulcanite I use two pounds of sulphur for the above-cited quantity of caoutchouc and mineral-wax compound. The time for the vulcanization of hard rubber is from seven to eight hours, starting with 235° Fahrenheit for one hour, and continuing at 250° Fahrenheit to 260° for the remainder of the time. To obtain various colors for rubber I may add metallic oxide, such as vermilion, white lead, or oxide of zinc, terra-alba, &c. For rapid vulcanization I may add oxide of lead and lamp-black, the proportions of each not to exceed in weight one-half the quantity of mineral wax used for a given quantity of the compound. For a cheap black elastic compound for rubber I use also coal-tar equal in quantity to the mineral wax. For electrical insulating purposes I use a larger quantity of mineral wax with the rubber, in about the following proportions: two pounds mineral wax, one pound rosin, four pounds caoutchouc, two and one-half pounds sulphur; but these proportions may be changed according to circumstances.

The various rubber products containing my mineral-wax and rosin mixture possess some remarkably good qualities. The soft elastic rubber is as good as that made of the purest rubber and sulphur. It is perfectly water-proof, and retains all these excellent qualities unchanged. The semi-hard rubber is a product the like of which has not been produced in the rubber industry. It is very like soft, pliable, fibrous leather, and is absolutely water-proof. The hard rubber also is a much finer material than the ordinary hard rubber. It takes a high polish and is easily and smoothly cut.

The following is what I claim as my invention:

1. The improved rubber compound, consisting of mineral wax or paraffine combined with rosin, sulphur, and rubber, substantially as set forth.

2. The improved mode of making rubber compounds, consisting in first melting together rosin and ozocerite or similar material and mixing this compound with caoutchouc and sulphur in about the proportions mentioned, and vulcanizing.

JOHN JOSEPH CHAS. SMITH.

Witnesses:
 JNO. E. ACKERMAN,
 HERM. GELPCKE.